United States Patent
Foskey et al.

(10) Patent No.: US 10,960,970 B2
(45) Date of Patent: Mar. 30, 2021

(54) INBOARD BEAM WITH PIN SYSTEM FOR ANTI-ROTATION AND CENTRIFUGAL FORCE RETENTION

(71) Applicant: Bell Helicopter Textron Inc., Fort Worth, TX (US)

(72) Inventors: Whitney Foskey, Keller, TX (US); Kyle Thomas Cravener, Watauga, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 161 days.

(21) Appl. No.: 16/184,436

(22) Filed: Nov. 8, 2018

(65) Prior Publication Data

US 2020/0148332 A1     May 14, 2020

(51) Int. Cl.
   *B64C 11/32*     (2006.01)
   *B64C 11/20*     (2006.01)

(52) U.S. Cl.
   CPC .............. *B64C 11/32* (2013.01); *B64C 11/20* (2013.01)

(58) Field of Classification Search
   CPC ......... B64C 3/32; B64C 27/32; B64C 27/322; B64C 27/33; B64C 27/35; B64C 27/48; B64C 2027/003
   See application file for complete search history.

(56) References Cited

U.S. PATENT DOCUMENTS

| | | | |
|---|---|---|---|
| 4,585,393 A | | 4/1986 | Hibyan et al. |
| 5,059,094 A | * | 10/1991 | Robinson ................ B64C 27/33 416/134 A |
| 5,110,259 A | * | 5/1992 | Robinson ................ F16F 1/393 144/144.1 |
| 5,636,970 A | | 6/1997 | Certain |
| 9,169,010 B2 | * | 10/2015 | Foskey .................. B64C 27/35 |
| 2016/0311178 A1 | * | 10/2016 | Cole ..................... B29C 53/043 |
| 2019/0233097 A1 | * | 8/2019 | Cravener ............... B64C 27/33 |
| 2020/0047880 A1 | * | 2/2020 | Dunn ..................... B64C 27/48 |

OTHER PUBLICATIONS

D. Berg, The Basics of Shoulder Screws, Oct. 3, 2011, Machine Design (Year: 2011).*

* cited by examiner

*Primary Examiner* — Courtney D Heinle
*Assistant Examiner* — Sang K Kim
(74) *Attorney, Agent, or Firm* — Shackelford, Bowen, McKinley & Norton, LLP

(57) ABSTRACT

An inboard beam includes a body having an upper flange and a lower flange coupled thereto. The upper flange includes a first upper inboard aperture and an upper outboard aperture formed therein. The lower flange includes a first lower inboard aperture and a lower outboard aperture formed therein. An upper beam fitting is coupled to the upper flange and lower beam fitting is coupled to the lower flange. The upper beam fitting includes a first upper inboard post. The upper beam fitting includes an upper outboard post extending parallel to the inboard post. The lower beam fitting includes a first lower inboard post. The lower beam fitting includes a lower outboard post extending parallel to the lower inboard post.

20 Claims, 11 Drawing Sheets

INBOARD BEAM WITH PIN SYSTEM FOR ANTI-ROTATION AND CENTRIFUGAL FORCE RETENTION

CROSS-REFERENCE TO RELATED APPLICATIONS

U.S. patent application Ser. No. 15/882,573, filed on Jan. 29, 2018, is incorporated herein by reference.

TECHNICAL FIELD

This application relates generally to aircraft rotor systems and more particularly, but not by way of limitation to aircraft rotor systems having a pin system for anti-rotation and centrifugal force retention.

BACKGROUND

This section provides background information to facilitate a better understanding of the various aspects of the disclosure. It should be understood that the statements in this section of this document are to be read in this light, and not as admissions of prior art.

Rotor systems of rotor-wing and tiltrotor aircraft include a yoke connected to a drive mast that is driven by a power source. The yoke transfers torque provided by the power source to rotor blades. The yoke is connected to the rotor blades with inboard and outboard beam assemblies via a grip. Depending on aircraft configuration, the yoke may be manufactured of steel for strength or composite material for weight savings. The grip is typically manufactured of composite material. The inboard and outboard beam assemblies include bearings that accommodate forces acting on the rotor blades allowing each rotor blade to flex with respect to the yoke and mast and other rotor blades. A distance between the inboard and outboard beam assemblies is dependent on the particular aircraft configuration. Each aircraft configuration has an optimal distance for that particular aircraft's loads and dynamics.

SUMMARY

Various aspects of the disclosure relate to an inboard beam assembly. One embodiment of an inboard beam assembly includes an inboard beam that includes a body. At least one flange is coupled to the body. The at least one flange includes a first inboard aperture and an outboard aperture formed therein. At least one beam fitting is coupled to the at least one flange. The at least one beam fitting includes a first inboard post. The first upper inboard post is received by the first inboard aperture. The at least one beam fitting includes an outboard post extending parallel to the first inboard post. The outboard post is received by the outboard aperture.

Various aspects of the disclosure relate to an inboard beam assembly. One embodiment of an inboard beam assembly includes an inboard beam that includes a body. An upper flange is coupled to the body. The upper flange includes a first upper inboard aperture and an upper outboard aperture formed therein. A lower flange is coupled to the body. The lower flange includes a first lower inboard aperture and a lower outboard aperture formed therein. An upper beam fitting is coupled to the upper flange. The upper beam fitting includes a first upper inboard post. The first upper inboard post is received by the first upper inboard aperture. The upper beam fitting includes an upper outboard post extending parallel to the inboard post. The upper outboard post is received by the upper outboard aperture. A lower beam fitting is coupled to the lower flange. The lower beam fitting includes a first lower inboard post. The first lower inboard post is received by the first lower inboard aperture. The lower beam fitting includes a lower outboard post extending parallel to the lower inboard post. The lower outboard post is received by the lower outboard aperture.

Various aspects of the disclosure relate to a rotor system for an aircraft. One embodiment of the rotor system includes a rotor blade. The rotor blade includes a grip. The rotor system includes a yoke. The yoke includes a yoke arm. An inboard beam assembly is coupled to the grip and rotatably coupled to the yoke arm. The inboard beam assembly includes a body. An upper flange is coupled to the body. The upper flange includes a first upper inboard aperture and an upper outboard aperture formed therein. A lower flange is coupled to the body. The lower flange includes a first lower inboard aperture and a lower outboard aperture formed therein. An upper beam fitting is coupled to the upper flange. The upper beam fitting includes a first upper inboard post. The first upper inboard post is received by the first upper inboard aperture. An upper outboard post extends parallel to the first upper inboard post. The upper outboard post is received by the upper outboard aperture. A lower beam fitting is coupled to the lower flange. The lower beam fitting includes a first lower inboard post. The first lower inboard post is received by the first lower inboard aperture. A lower outboard post extends parallel to the inboard post. The lower outboard post is received by the lower outboard aperture.

Various aspects of the disclosure relate to a method of installing an inboard beam assembly. The method includes arranging an inboard beam in a grip of a rotor blade such that a first upper inboard aperture of the inboard beam aligns with a first upper inboard aperture of the grip, a first lower inboard aperture of the inboard beam aligns with a first lower inboard aperture of the grip, an upper outboard aperture of the inboard beam aligns with an upper outboard aperture of the grip, and a lower outboard aperture of the inboard beam aligns with the lower outboard aperture of the grip. The method includes assembling an upper beam fitting such that a first upper inboard post is received through the first upper inboard aperture of the grip and the first upper inboard aperture of the inboard beam. The method includes assembling a lower beam fitting such that a first lower inboard post is received through the first lower inboard aperture of the grip and the first lower inboard aperture of the inboard beam.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
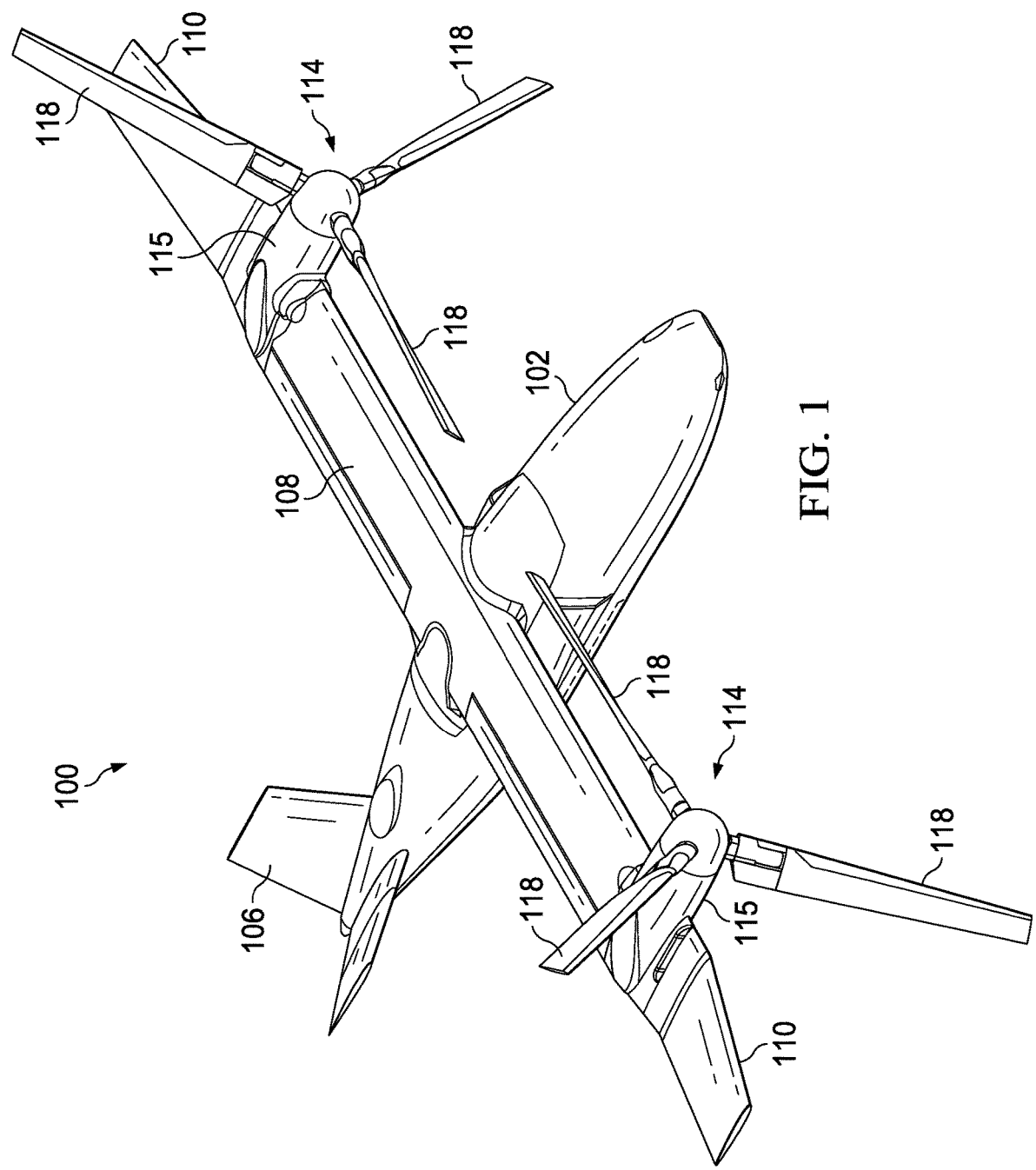
FIG. 1 is a perspective view of a tiltrotor aircraft in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Generally an aircraft rotor system includes a drive mast that is driven by a power source. The rotor system includes a yoke connected to the drive mast with a hub and rotor blades indirectly connected to the yoke with inboard and outboard beam assemblies via a grip. The beam assemblies include bearings that accommodate forces acting on the rotor blades and allow each rotor blade to flex with respect to the yoke, the mast, and other rotor blades. In certain flight conditions, the weight of the rotor blades and the lift of rotor blades may result in transverse forces on the yoke and other components. Examples of transverse forces include forces that cause "flapping" and "coning" of the rotor blades. Flapping generally refers to gimbaling motion of the hub that connects the yoke to the mast. Coning generally refers to upward flexing of a rotor blade due to lift forces acting on the rotor blade. In various flight conditions, the rotor blades may be subject to other forces, such as axial, lead/lag, and feathering forces. Axial forces generally refer to centrifugal force and centripetal force on the rotor blades during rotation of the rotor blades. Lead/lag forces generally refer to forces causing the horizontal movement of the rotor blades about a vertical pin occurring if, for example, the rotor blades do not rotate at the same rate as the yoke. Feathering forces generally refer to forces causing twisting motions that cause a rotor blade to change pitch. The power source, drive mast, and yoke are components for transmitting torque. The power source may include a variety of components including an engine, a transmission, and differentials. In operation, the drive mast receives torque from the power source and rotates the yoke. Rotation of the yoke causes the rotor blades to rotate with the drive mast and yoke.

Referring to FIG. 1, an illustrative aircraft 100 is shown. By way of example, the aircraft 100 is shown in FIG. 1 as being a tilt-rotor aircraft; however, in other embodiments, the aircraft 100 could also be a rotor-wing aircraft. The aircraft 100 includes a fuselage 102, a tail member 106, a wing 108, and a rotor system 114. The rotor system 114 is connected to a nacelle 115 located on an end portion of the wing 108. In various embodiments, the aircraft 100 may also include a wing tip 110 that may be pivotable at a location on the wing 108 outboard of the nacelle 115. The nacelle 115 is pivotable between a helicopter mode where the rotor systems are generally vertical and an airplane mode where the rotor systems are generally horizontal. The rotor system 114 includes a plurality of rotor blades 118. The angle of the nacelle 115 relative to the wing 108, as well as the pitch of the rotor blades 118, can be adjusted in order to selectively control direction, thrust, and lift of the aircraft 100. By way of example, the aircraft 100 is shown in FIG. 1 as including two nacelles 115 that are arranged symmetrically about the fuselage 102; however, in other embodiments, the aircraft 100 may include any number of nacelles. For instance, in various embodiments, a rotor-wing aircraft may include a single nacelle.

The fuselage 102 represents the body of the aircraft 100 and may be coupled to the rotor system 114 such that the rotor system 114 with the rotor blades 118 may move the aircraft 100 through the air. The landing gear supports the aircraft 100 when the aircraft 100 is landing or when the aircraft 100 is at rest on the ground. Further, the rotor system 114 is illustrated, by way of example in FIG. 1, in the context of the aircraft 100 being a tiltrotor aircraft; however, a singular rotor system with foldable or non-foldable rotor blades can be implemented in rotor systems of other rotor-wing aircraft. It should also be appreciated that teachings from the aircraft 100 may apply to other fixed-wing aircraft such as airplanes as well as unmanned aircraft that employ rotor systems.

Figure 2:
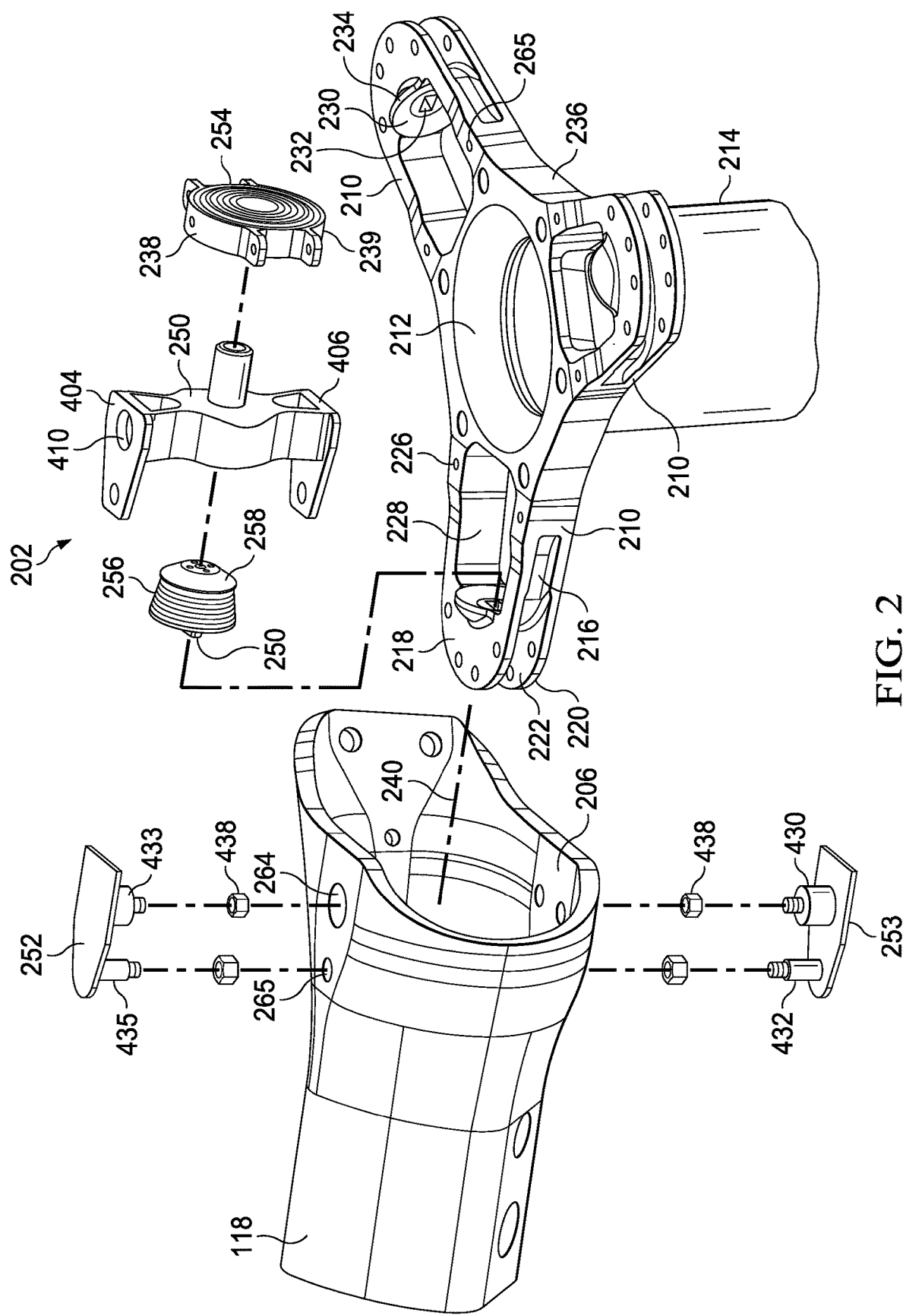
FIG. 2 is an exploded perspective view of a yoke, an inboard beam assembly, and a grip according to aspects of the disclosure.
Figure 3:
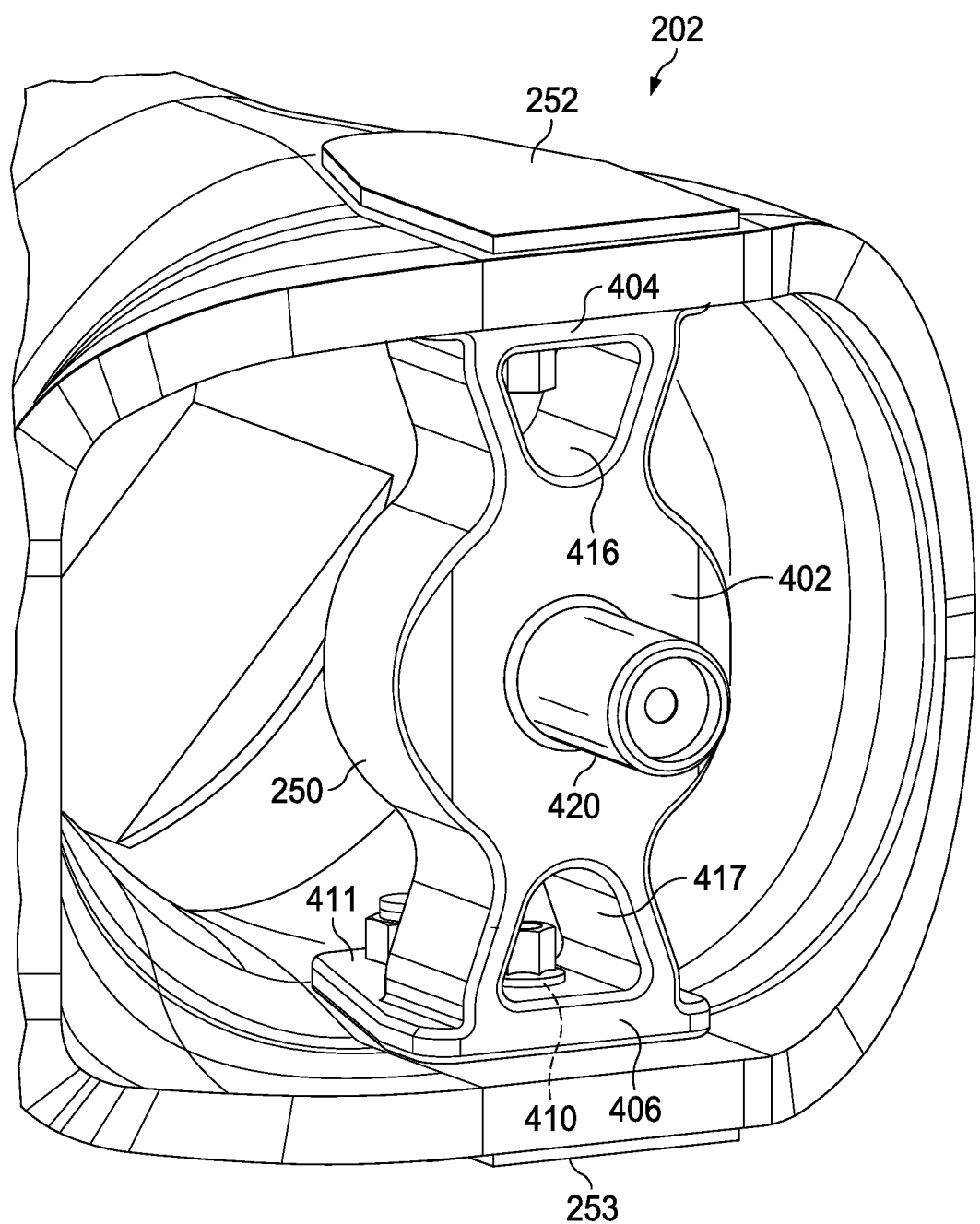
FIG. 3 is a perspective view of an inboard beam assembly mounted to a grip according to aspects of the disclosure.

FIG. 2 is an exploded view of a yoke 204, an inboard beam assembly 202, and a grip 206. FIG. 3 is a perspective view of the inboard beam assembly 202 mounted to the grip 206. Referring to FIGS. 2 and 3, the yoke 204 includes a plurality of yoke arms 210 extending radially from a central aperture 212. Each yoke arm 210 is generally equally spaced from each other around the central aperture 212. For example, in the three-rotor-blade configuration, shown in FIG. 2, 120° separates each yoke arm 210. In the interest of clarity, a single inboard beam assembly 202 is described herein with the understanding that, in use, each yoke arm 210 includes an inboard beam assembly 202 and a grip 206. It should be appreciated that teachings regarding the inboard beam assembly 202 can apply to rotor systems having any number of yoke arms 210.

The yoke 204 is connected to the drive mast 214 through the central aperture 212 via a hub spring assembly. In various embodiments, the yoke arm 210 is a unitary portion of the yoke 204. The yoke arm 210 includes a weight pocket 216. The weight pocket 216 reduces an overall weight of the yoke 204 without comprising the strength of the yoke 204.

The yoke arm 210 includes an upper tang 218 and a lower tang 220, which define a space 222 between the upper tang 218 and the lower tang 220. The yoke arm 210 also includes a cut-out 228. The cut-out 228 extends from proximate the central aperture 212 to the upper tang 218 and the lower tang 220. The cut-out 228 is sized to allow the inboard beam assembly 202 to fit within the cut-out 228. The cut-out 228 includes a cone seat 230. The cone seat 230 is integrally formed with the yoke arm 210 within cut-out 228. The cone seat 230 may, in various embodiments, be a unitary portion of the yoke arm 210 that has a curved surface defining a conical cavity. The cone seat 230 includes a curved surface 232. The curved surface 232 is, for example, conical or parabolic shaped and includes a slot 234. The CF bearing 256 includes a curved surface 258 opposite a tab 260. The curved surface 258 engages the inboard beam assembly 202 and the tab 260 is sized and shaped to be received into the slot 234. Engagement of the tab 260 with the slot 234 prevents rotation of the CF bearing 256 relative to the inboard beam assembly 202 and the yoke 204 about a central longitudinal axis 240 of the CF bearing 256. As an alternative, in various embodiments, the yoke arm 210 may include a clevis that extends from the cone seat 230 and attaches to the CF bearing 256 to provide anti-rotation functionality. The yoke arm 210 includes the mounting holes 236. The mounting holes 236 are used to connect an upper clamp plate 238 and a lower clamp plate 239 to the yoke arm 210. The upper clamp plate 238 and the lower clamp plate 239 abut and hold a shear bearing 254. The CF bearing 256 and the shear bearing 254 are generally elastomeric bearings constructed from a rubber-type material that absorb vibration and provide for limited movement of the rotor blades relative to the yoke 204 and the drive mast 214. By way of example, the yoke 210 is illustrated in FIG. 2 as having the upper tang 218 and the lower tang 220; however, in various embodiments, the yoke 210 may omit one or both of the upper tang 218 and the lower 220.

The inboard beam assembly 202 includes an inboard beam 250, an upper beam fitting 252, and a lower beam fitting 253. The grip 206 includes a lower inboard aperture 262, a lower outboard aperture 263, an upper inboard aperture 264, and an upper outboard aperture 265. In various embodiments, bushings may be included in the lower inboard aperture 262, the lower outboard aperture 263, the upper inboard aperture 264, and the upper outboard aperture 265. The rotor blade 118 is connected to the yoke arm 210 via the grip 206 and shares the central longitudinal axis 240 with the yoke arm 210 and the grip 206. The central longitudinal axis 240 of a rotor blade 118 may also be referred to as a blade-pitch-change axis. In various embodiments, however, the rotor blade 118 and the grip 206 may be integral.

The upper beam fitting 252 includes an upper inboard post 433 and an upper outboard post 435. The lower beam fitting 253 includes a lower inboard post 430 and a lower outboard post 432. The upper inboard post 433 and the upper outboard post 435 extend from the upper beam fitting 252 generally perpendicular to a plane of the upper beam fitting 252. Likewise, the lower inboard post 430 and the lower outboard post 432 extend from the lower beam fitting 253 generally perpendicular to a plane of the lower beam fitting 253. The lower inboard post 430 and the lower outboard post 432 are arranged generally parallel to each other and the upper inboard post 433 and the upper outboard post 435 are arranged generally parallel to each other. In various embodiments, the lower inboard post 430 and the upper inboard post 433 are constructed with a diameter larger than that of the lower outboard post 432 and the upper outboard post 435, respectively, in an effort to facilitate support of CF forces and centripetal forces acting on the rotor blade 118 during operation. In use, the lower outboard post 432 and the upper outboard post 435 prevent rotation of the inboard beam assembly 202 relative to the grip 206 that may result, for example, from lead/lag forces. When assembled, the lower inboard post 430 and the lower outboard post 432 are received through the lower inboard aperture 262 and the lower outboard aperture 263, respectively, that are formed in the grip 206. Likewise, the upper inboard post 433 and the upper outboard post 435 are received through the upper inboard aperture 264 and the upper outboard aperture 265, respectively. The upper inboard post 433 of the upper beam fitting 252 is received through the inboard mounting hole 410 of the upper flange 404. The upper inboard post 433 and the upper outboard post 435 are secured with a fastener 438. The lower inboard post 430 of the lower beam fitting 253 is received through the inboard mounting hole 410 of the lower flange 406. The lower inboard post 430 and the lower outboard post 432 are secured with the fastener 438. In various embodiments, the fastener may be, for example, a castellated nut. In use, the upper clearance cut 416 and the lower clearance cut 417 facilitate installation and securement of the fastener 438.

FIG. 3 is a perspective view of the inboard beam assembly 202 mounted to the grip 206. The inboard beam 250 includes a body 402 extending between an upper flange 404 and a lower flange 406. The upper flange 404 and the lower flange 406 include an inboard mounting hole 410 and an outboard mounting hole 411. The inboard mounting hole 410 and the outboard mounting hole 411 are used to attach the inboard beam 250 to the upper beam fitting 252 and the lower beam fitting 253. The body 402 includes an upper clearance cut 416 and a lower clearance cut 417. The upper clearance cut 416 and the lower clearance cut 417 reduce the overall weight of the inboard beam assembly 202 without comprising the strength of the inboard beam assembly 202. The upper clearance cut 416 and the lower clearance cut 417 facilitate access to the fasteners 438. The inboard beam 250 includes a shaft 420 extending from the body 402 toward the central aperture 212.

Figure 4:
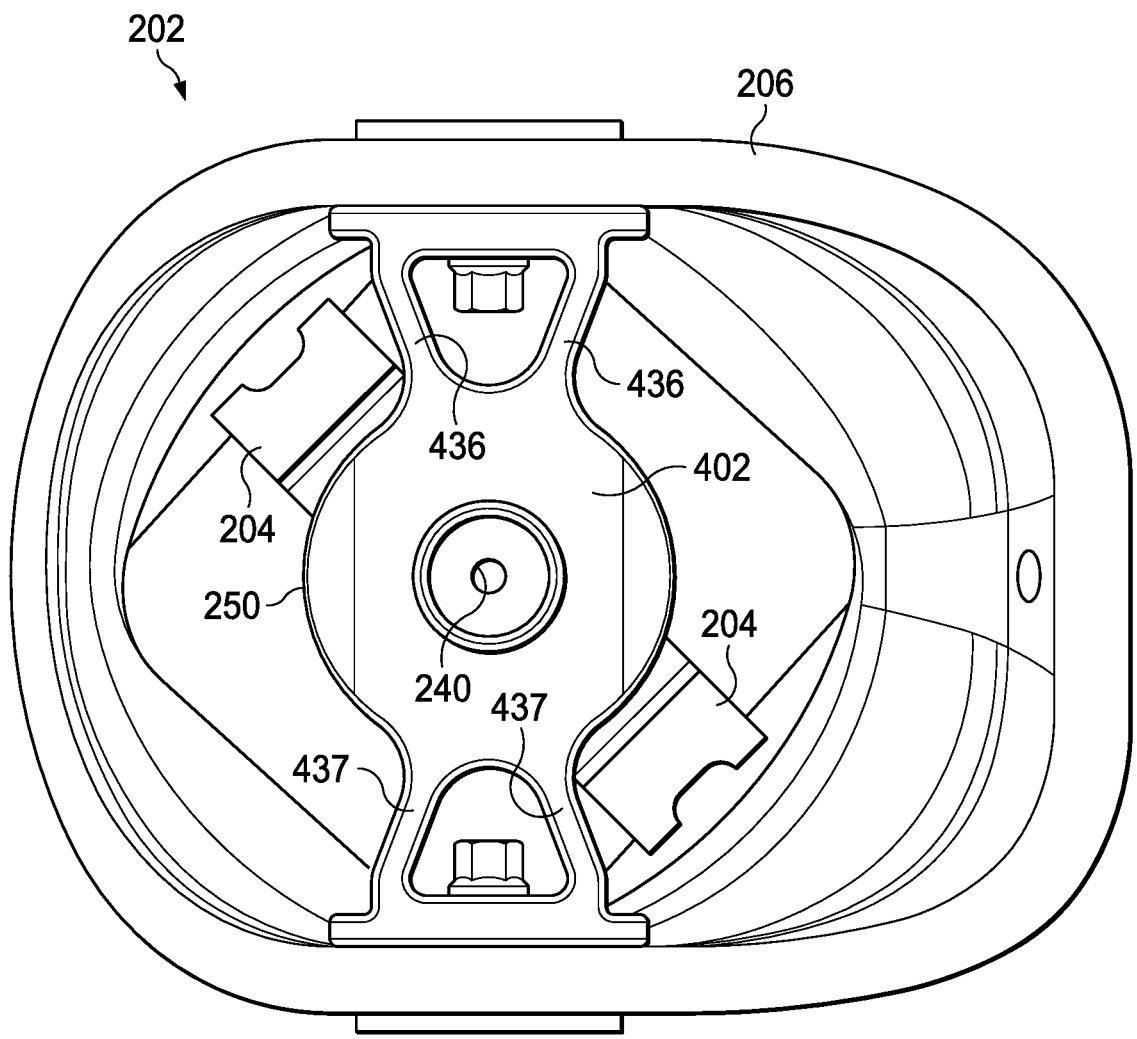
FIG. 4 is an axial view of an inboard beam assembly mounted to a grip of a feathered rotor according to aspects of the disclosure.
Figure 5:
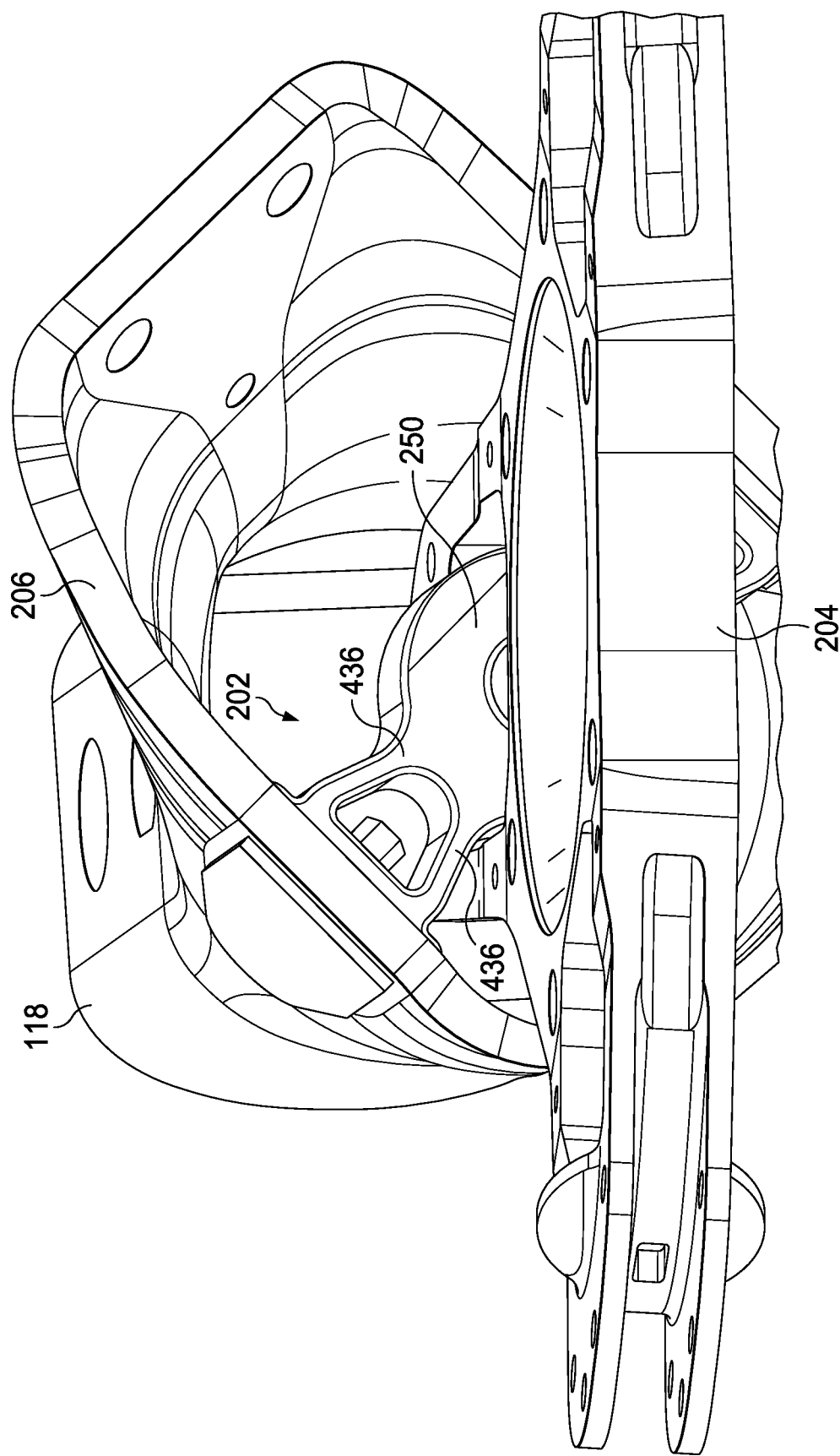
FIG. 5 is a perspective view of an inboard beam assembly mounted to a grip and a yoke according to aspects of the disclosure.
Figure 6:
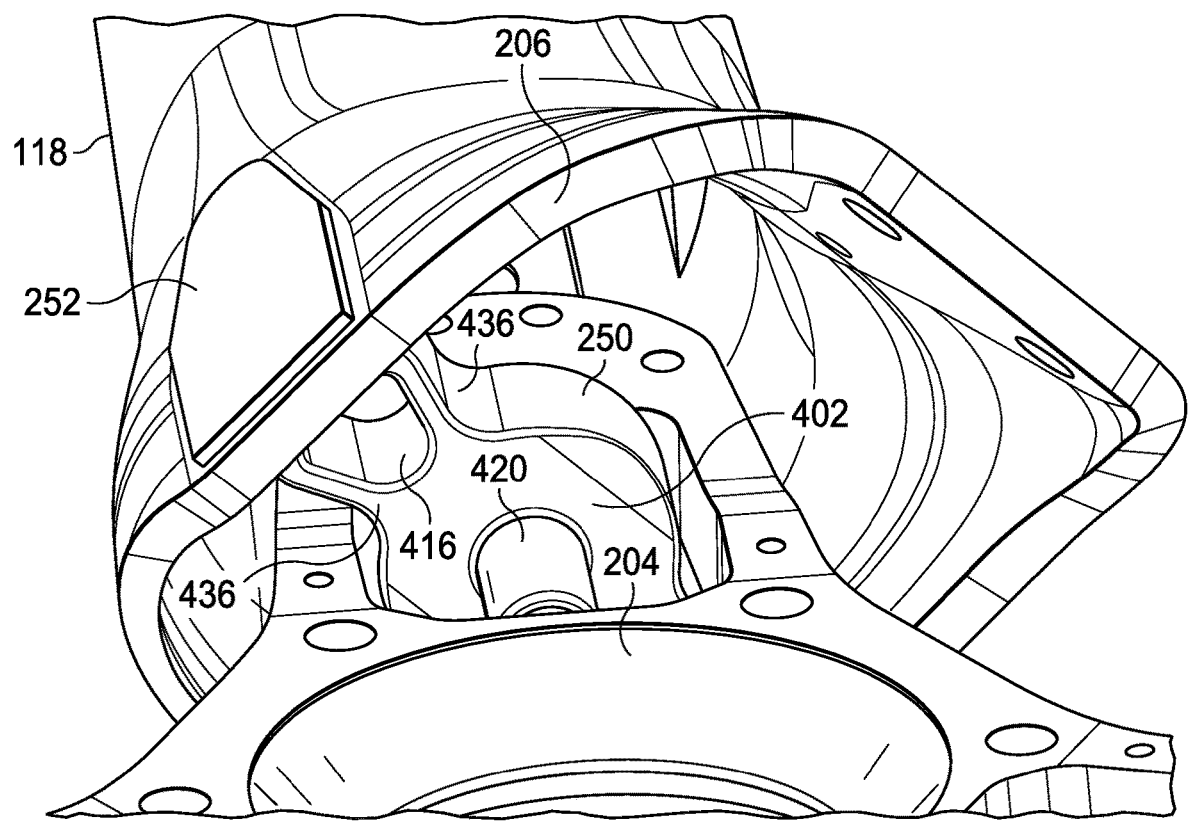
FIG. 6 is a perspective view of an inboard beam assembly mounted to a grip and a yoke illustrating rotor feathering according to aspects of the disclosure.

FIG. 4 is an axial view of the inboard beam assembly 202 mounted to the grip 206 of the rotor blade 118 in a feathered position. FIG. 5 is a perspective view of the inboard beam assembly 202 mounted to the grip 206 and the yoke 204. FIG. 6 is a perspective view of the inboard beam assembly 202 mounted to the grip 206 and the yoke 204 illustrating feathering of the rotor blade 118. Referring to FIGS. 4-6 collectively, the inboard beam assembly 202 rotates about the central longitudinal axis 240 so as to facilitate feathering of the rotor blade 118. While the rotor blade 118 is shown by way of example in FIGS. 4-6 as being feathered in a counter-clockwise direction relative to the yoke 204, one skilled in the art will recognize that the rotor blade 118 could also be feathered in the clockwise direction relative to the yoke 204. The body 402 of the inboard beam 250 includes upper detents 436 arranged above the shaft 420 and lower detents 437 arranged below the shaft 420. The upper detents 436 and the lower detents 437 facilitate increased rotation of the inboard beam 250 relative to the yoke 204 during feathering of the rotor blade 118. If, for instance, the upper detents 436 and the lower detents 437 were not present, the inboard beam 250 would interfere with the yoke 204 before the rotor blade 118 is fully rotated to a feathered position.

Figure 7:
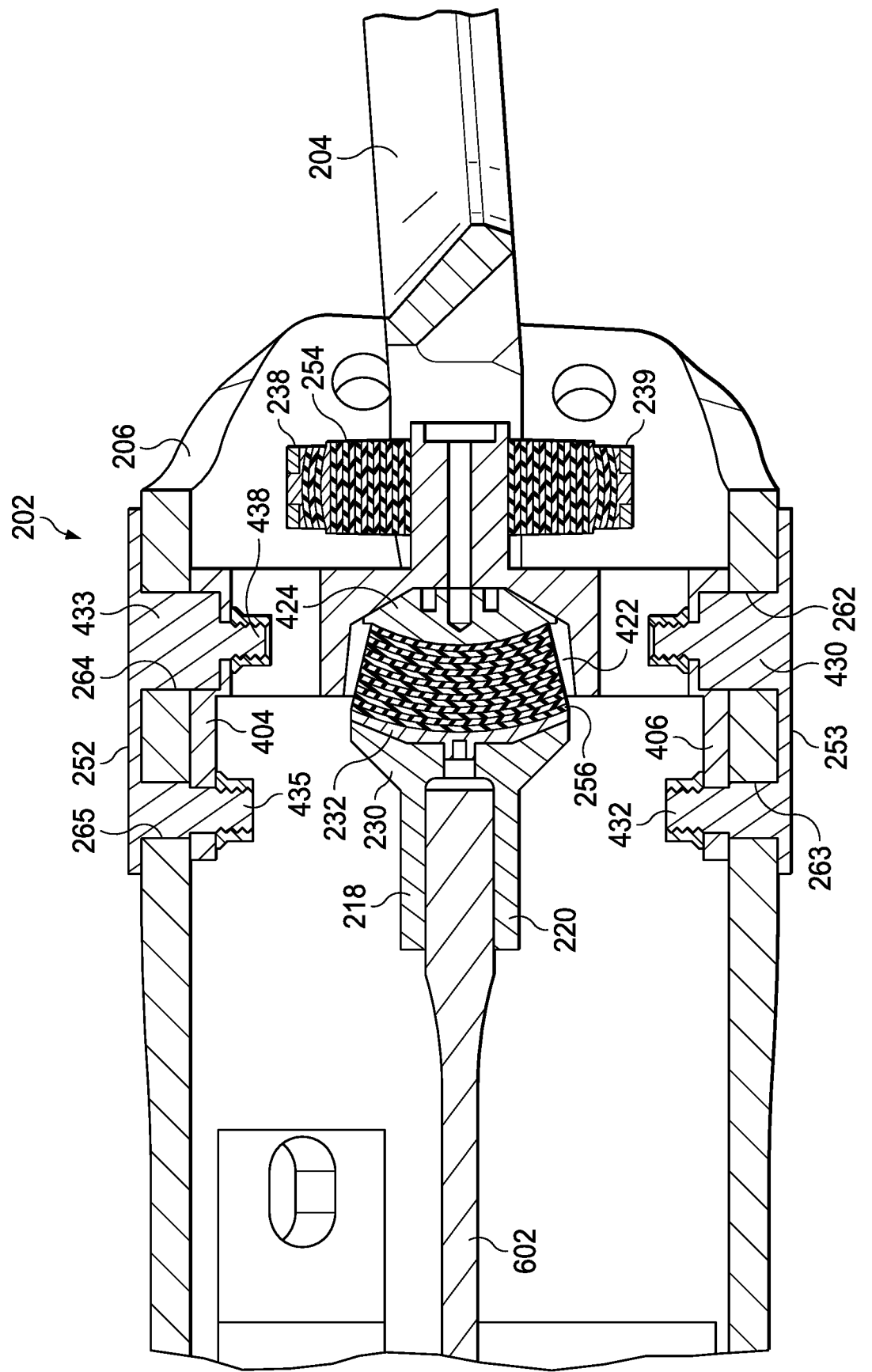
FIG. 7 is a cross-sectional view of an inboard beam assembly mounted to a grip and a yoke according to aspects of the disclosure.

FIG. 7 is a cross-sectional view of the inboard beam assembly 202 mounted to the grip 206 and the yoke 204. The lower inboard post 430 engages the lower inboard aperture 262 of the grip 206 and the lower outboard post 432 is received through the lower outboard aperture 263 of the grip 206. The lower inboard post 430 and the lower outboard post 432 are secured to the lower flange 406 via the fastener 438. During operation, the lower inboard post 430 supports CF forces and centripetal forces and the lower outboard post 432 prevents rotation of the rotor blade 118 relative to the yoke 204. In similar fashion, the upper inboard post 433 engages the upper inboard aperture 264 of the grip 206 and the upper outboard post 435 is received through the upper outboard aperture 265 of the grip 206. The upper inboard post 433 and the upper outboard post 435 are secured to the upper flange 404 via the fastener 438. During operation, the upper inboard post 433 supports CF forces and centripetal forces and the upper outboard post 435 prevents rotation of the inboard beam assembly 202 relative to the grip 206.

The yoke arm 210 includes the upper tang 218 and the lower tang 220 that are used to connect to a flexure arm 602. In various embodiments, the flexure arm 602 is manufactured of a flexible composite material. Reinforcement material within the flexure arm 602 can be oriented to customize how the flexure arm 602 responds to certain loads. In various embodiments, the reinforcement material can be arranged within the flexure arm 602 such that it is stiff axially and laterally to resist centrifugal forces and lead/lag forces, however the flexure arm 602 is flexible vertically in a direction generally parallel with the drive mast to permit coning. In various embodiments, actual flexibility values provided by the constituent materials and arrangement of reinforcement layers are dependent on a particular aircraft's loads and dynamics. The flexure arm 602 further connects to the grip 206 via an outboard beam assembly (not shown). In various embodiments, the yoke 204 and the flexure arm 602 are integral. In still other embodiments, the flexure arm 602 may be omitted.

The upper tang 218 and the lower tang 220 define the space 222 between them. The space 222 is sized to engage the flexure arm 602. The upper tang 218 and the lower tang 220 provide a double-shear connection to the flexure arm 602. Alternatively, the flexure arm 602 may include a set of tangs sized to engage a solid yoke arm end to provide the double shear connection. The yoke arm 210 includes mounting holes 226 (shown in FIG. 2). The mounting holes 226 are used to connect the yoke arm 210 to the flexure arm 602. In various embodiments, the connection between the yoke arm 210 and the flexure arm 602 does not carry any centrifugal force ("CF") load.

The body 402 includes a cavity 422 concentrically aligned with the shaft 420. The cavity 422 includes a curved surface 424. The curved surface 424 is conical or parabolic shaped and positioned on the body 402 opposite of the shaft 420.

Still referring to FIG. 7, the flexure arm 602 is connected to the yoke 204 between the upper tang 218 and the lower tang 220. The CF bearing 256 is held by and between the curved surface 424 of the cavity 422 and the curved surface 232 of the cone seat 230. The curved surfaces tend to axially center the CF bearing 256 within the cavity 422 and the cone seat 230 when the CF bearing 256 is under compression from CF loads. It should be understood that the CF bearing is axially centered when a central longitudinal axis of the CF bearing 256 generally intersects the center point of the curved surface 232 of the cone seat 230 and the curved surface 424 of the cavity 422. The shear bearing 254 is attached to the shaft 420, for example by vulcanization or adhesive. The upper clamp plate 238 and the lower clamp plate 239 and the shaft 420 hold or constrain the shear bearing 254. The CF load path of the rotor blade 118 attached to the grip 206 is from the grip 206 to the upper beam fitting 252 and the lower beam fitting 253, to the inboard beam 250, through the CF bearing 256 to the yoke 204. The connection between the yoke 204 and the flexure arm 602 does not carry any CF load.

Figure 8:
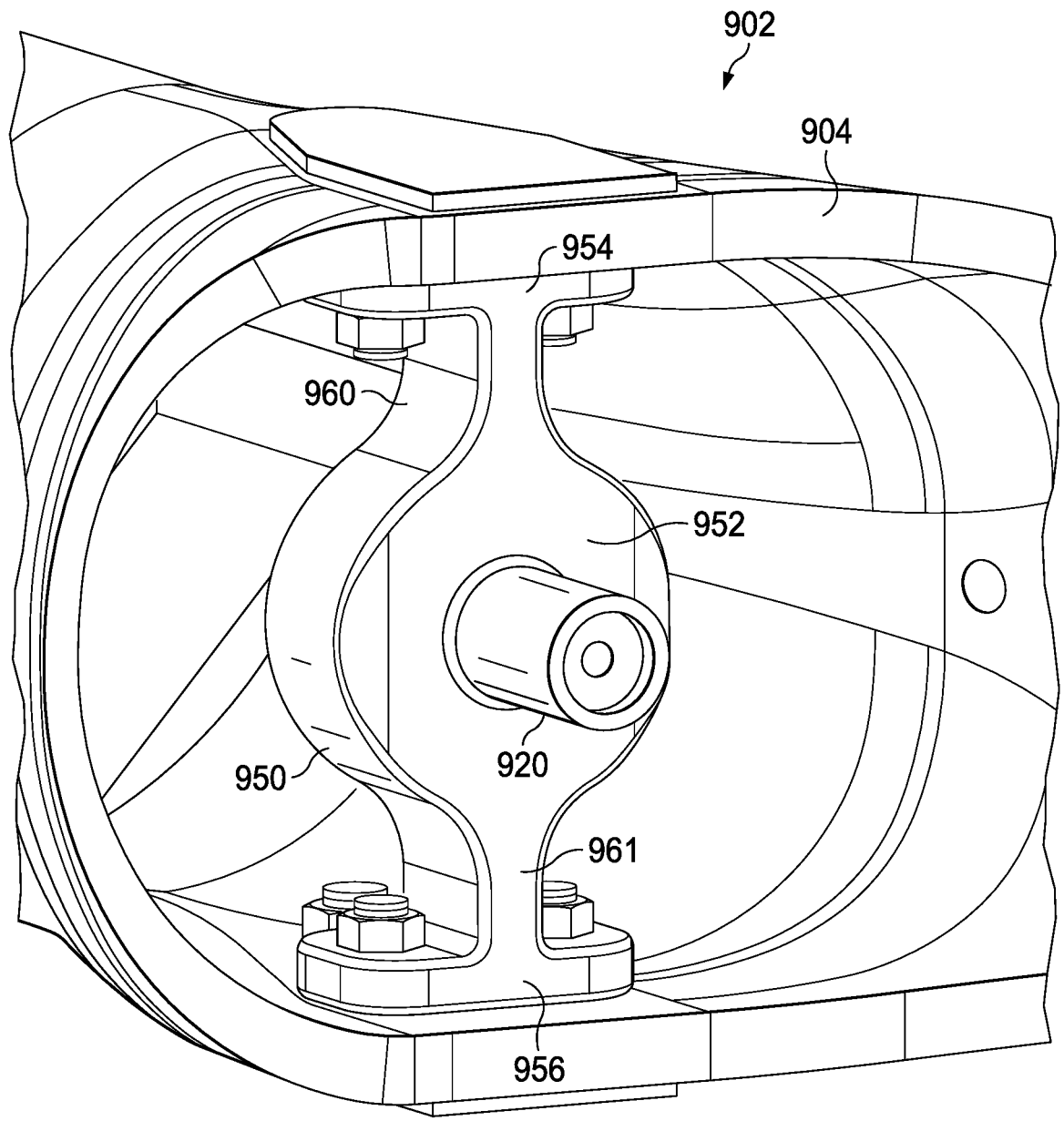
FIG. 8 is a perspective view of an inboard beam assembly mounted to a grip according to aspects of the disclosure.
Figure 9:
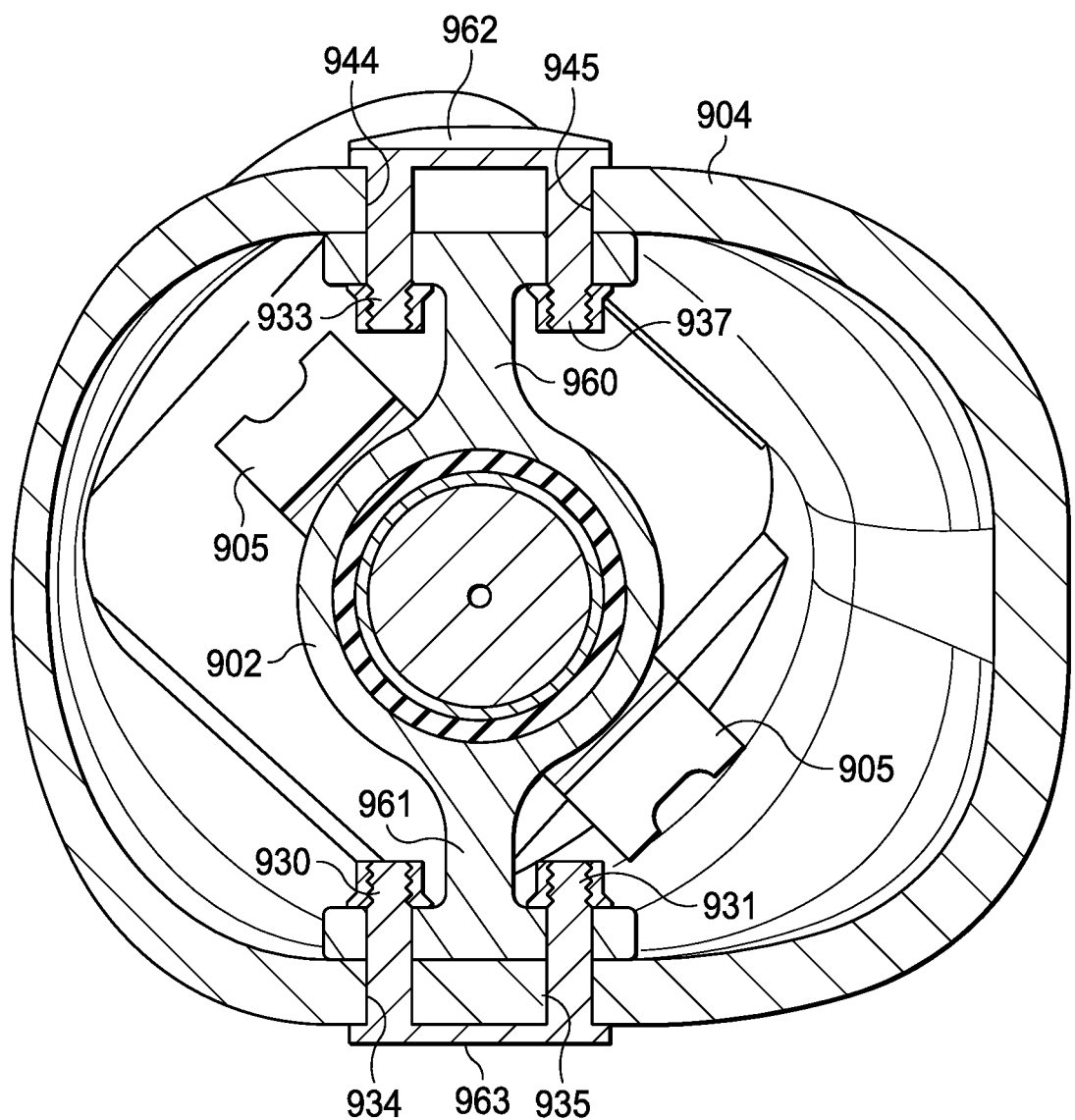
FIG. 9 is an axial view of an inboard beam assembly mounted to a grip of a feathered rotor according to aspects of the disclosure.
Figure 10:
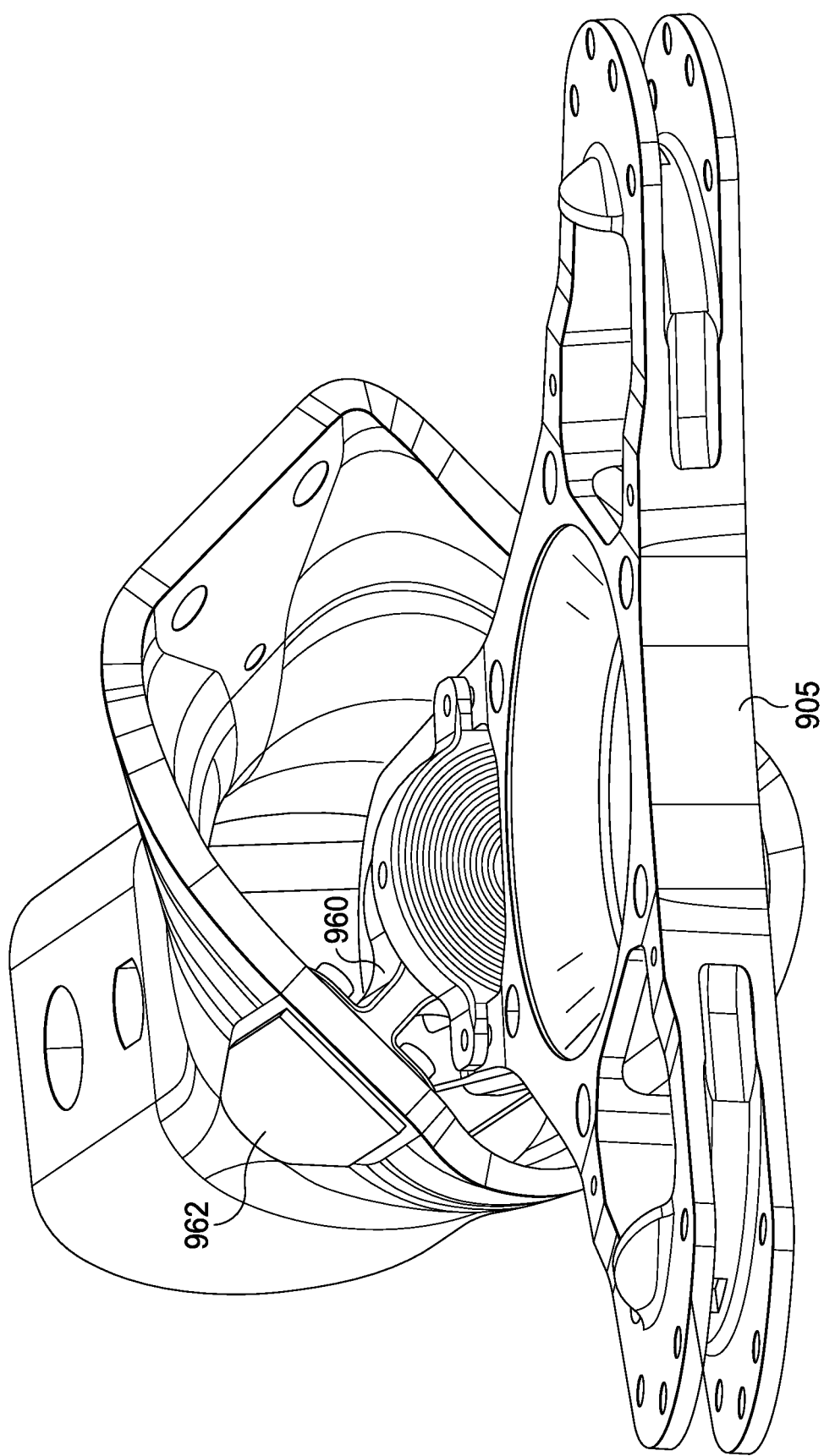
FIG. 10 is a perspective view of an inboard beam assembly mounted to a grip and a yoke according to aspects of the disclosure.

FIG. 8 is a perspective view of an inboard beam assembly 902 mounted to a grip 904. FIG. 9 is an axial view of the inboard beam assembly 902 mounted to the grip 904 of the rotor blade 118 in the feathered position. FIG. 10 is a perspective view of the inboard beam assembly 902 mounted to the grip 904 and a yoke 905. Referring to FIGS. 8-10 collectively, the inboard beam 950 includes a body 952 extending between an upper flange 954 and a lower flange 956. An upper beam fitting 962 is coupled to the upper flange 954 and a lower beam fitting 963 is coupled to the lower flange 956. An upper neck region 960 is located between the body 952 and the upper flange 954 and a lower neck region 961 is located between the body 952 and the lower flange 956. The inboard beam 950 includes a shaft 920 extending from the body 952 toward the central aperture 212.

Figure 11:
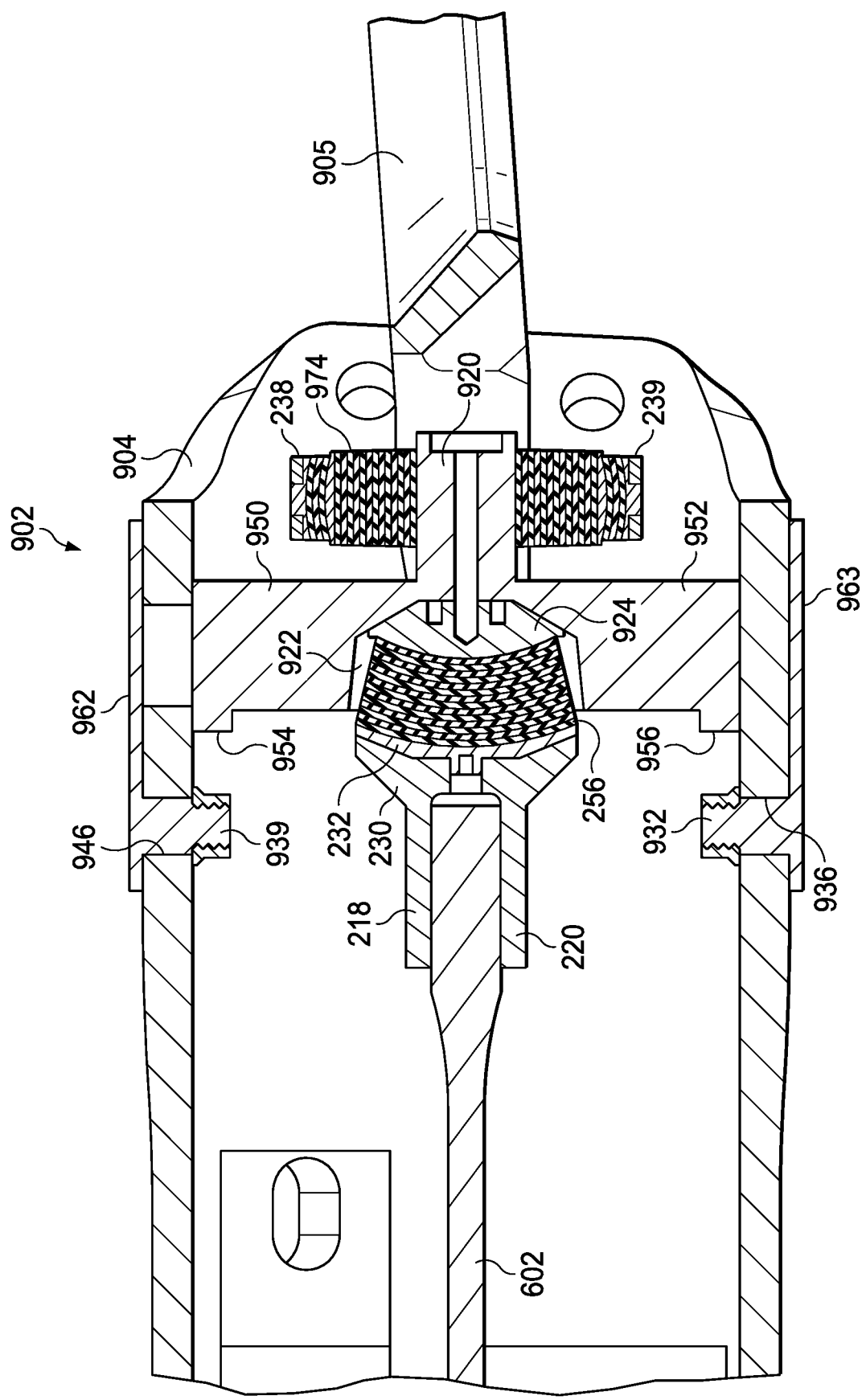
FIG. 11 is a cross-sectional view of an inboard beam assembly mounted to a grip and a yoke according to aspects of the disclosure.

The lower beam fitting 963 includes a first lower inboard post 930, a second lower inboard post 931, and a lower outboard post 932 (shown in FIG. 11). The upper beam fitting 962 includes a first upper inboard post 933, a second upper inboard post 937, and an upper outboard post 939. The first lower inboard post 930, the second lower inboard post 931, and the lower outboard post 932 extend from the lower beam fitting 963 generally perpendicular to a plane of the lower beam fitting 963. The first upper inboard post 933, the second upper inboard post 937, and the upper outboard post 939 extend from the upper beam fitting 962 generally perpendicular to a plane of the upper beam fitting 962. The first lower inboard post 930, the second lower inboard post 931, and the lower outboard post 932 are arranged generally parallel to each other. Likewise, the first upper inboard post 933, the second upper inboard post 937, and the upper outboard post 939 are arranged generally parallel to each other. In various embodiments, the first lower inboard post 930 and the second lower inboard post 931 are constructed with a diameter larger than a diameter of the lower outboard post 932 in an effort to facilitate support of CF forces and centripetal forces during operation. Likewise, the first upper inboard post 933 and the second upper inboard post 937 are constructed with a diameter larger than a diameter of the upper outboard post 939 in an effort to facilitate support of CF forces and centripetal forces during operation. In use, the lower outboard post 932 and the upper outboard post 939 prevent rotation of the grip 904 relative to the yoke 905 that may result, for example, from lead/lag forces. When assembled, the first lower inboard post 930, the second lower inboard post 931, and the lower outboard post 932 are received through a first lower inboard aperture 934, a second lower inboard aperture 935, and a lower outboard aperture 936, respectively, that are formed in the grip 904. The first upper inboard post 933, the second upper inboard post 937, and the upper outboard post 939 are received through a first upper inboard aperture 944, a second upper inboard aperture 945, and an upper outboard aperture 946, respectively, that are formed in the grip 904. The first lower inboard post 930, the second lower inboard post 931, and the lower outboard post 932 of the lower beam fitting 963 are received through the lower flange 956 and are secured thereto with a fastener 938. The first upper inboard post 933, the second upper inboard post 937, and the upper outboard post 939 of the upper beam fitting 962 are received through the upper flange 954 and are secured thereto with the fastener 938. In various embodiments, the fastener 938 may be, for example, a castellated nut.

Referring specifically to FIG. 9, when the inboard beam assembly 902 is assembled to the yoke 905, the inboard beam 950 is able to rotate about the central axis 951 during feathering of the rotor blade 118. The upper neck region 960 and the lower neck region 961 facilitate increased rotation of the inboard beam 950 relative to the yoke 905 during feathering of the rotor blade 118. If, for instance, upper neck region 960 and the lower neck region 961 were not present, the inboard beam 950 would interfere with the yoke 905 before the rotor blade 118 is fully rotated to a feathered position.

FIG. 11 is a cross-sectional view of an inboard beam assembly 902 mounted to the grip 904 and the yoke 905. The first lower inboard post 930 (shown in FIGS. 8-10) engages the first lower inboard aperture 934 and the second lower inboard post 931 (shown in FIGS. 8-10) engages the second lower inboard aperture 935. The lower outboard post 932 is received through the lower outboard aperture 936. The first lower inboard post 930 and the second lower inboard post 931 are secured to the lower flange 956 via the fastener 938. During operation, the first lower inboard post 930 and the second lower inboard post 931 support CF forces and centripetal forces and the lower outboard post 932 prevents rotation of the inboard beam assembly 902 relative to the grip 904. Similarly, the first upper inboard post 933 (shown in FIGS. 8-10) engages the first upper inboard aperture 944 and the second upper inboard post 937 (shown in FIGS. 8-10) engages the second upper inboard aperture 945. The upper outboard post 939 is received through the upper outboard aperture 946. The first upper inboard post 933 and the second upper inboard post 937 are secured to the upper flange 954 via the fastener 938. During operation, the first upper inboard post 933 and the second upper inboard post 937 support CF forces and centripetal forces and the upper outboard post 939 prevents rotation of the inboard beam assembly 902 relative to the grip 904.

The body 952 includes a cavity 922 concentrically aligned with the shaft 920. The cavity 922 includes a curved surface 924. The curved surface 924 is conical or parabolic shaped and positioned on the body 952 opposite of the shaft 920. The inboard beam assembly 902 includes a central axis 951.

Still referring to FIG. 11, the flexure arm 602 is received into the space 222 in the yoke 905 defined between the upper tang 218 and the lower tang 220. The CF bearing 256 is held by and between the curved surface 924 of the cavity 922 and the curved surface 232 of the cone seat 230. The curved surfaces tend to axially center the CF bearing 256 within the cavity 922 and the cone seat 230 when the CF bearing 256 is under compression from CF loads. The shear bearing 974 is attached to the shaft 920, for example by vulcanization or adhesive. The upper clamp plate 238, the lower clamp plate 239, and the shaft 920 hold or constrain the shear bearing 974. The CF load path of the rotor blade 118 attached to the grip 904 is from the grip 904 to the upper beam fitting 962 and the lower beam fitting 963, to the inboard beam 950, through the CF bearing 256 to the yoke 905. The connection between the yoke 905 and the flexure arm 602 does not carry any CF load.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An inboard beam assembly, comprising:
   an inboard beam, comprising:
      a body;
      an upper flange coupled to the body, the upper flange having a first upper inboard aperture and an upper outboard aperture formed therein; and
      a lower flange coupled to the body, the lower flange having a first lower inboard aperture and a lower outboard aperture formed therein;
   an upper beam fitting coupled to the upper flange, the upper beam fitting comprising:
      a first upper inboard post, the first upper inboard post being received by the first upper inboard aperture and secured to the upper flange via a threaded extension from the first upper inboard post; and
      an upper outboard post and extending parallel to the first upper inboard post, the upper outboard post being received by the upper outboard aperture and secured to the upper flange via a threaded extension from the upper outboard post;
   an upper clearance cut formed in the body proximate the upper flange, the upper clearance cut comprising an opening in the body that provides access to the threaded extension from the first upper inboard post and the threaded extension from the upper outboard post;
   a lower beam fitting coupled to the lower flange, the lower beam fitting comprising:
      a first lower inboard post, the first lower inboard post being received by the first lower inboard aperture and secured to the lower flange via a threaded extension from the first lower inboard post; and
      a lower outboard post extending parallel to the first lower inboard post, the lower outboard post being received by the lower outboard aperture and secured to the lower flange via a threaded extension from the lower outboard post.

2. The inboard beam assembly of claim 1, comprising:
   a lower clearance cut formed in the body proximate the lower flange, the lower clearance cut comprising an opening in the body that provides access to the threaded extension from the first lower inboard post and threaded extension from the lower outboard post.

3. The inboard beam assembly of claim 1, wherein:
   the upper beam fitting comprises a second upper inboard post extending generally parallel to the first upper inboard post; and the lower beam fitting comprises a second lower inboard post extending generally parallel to the first lower inboard post.

4. The inboard beam assembly of claim 1, wherein:
the first upper inboard post has a diameter larger than a diameter of the upper outboard post; and
the first lower inboard post has a diameter larger than a diameter of the lower outboard post.

5. The inboard beam assembly of claim 1, wherein the first upper inboard post and the first lower inboard post support centrifugal force and centripetal force.

6. The inboard beam assembly of claim 1, wherein the upper outboard post and the lower outboard post support anti-rotation forces.

7. A rotor system for an aircraft, the rotor system comprising:
a rotor blade comprising a grip;
a yoke comprising a yoke arm;
an inboard beam assembly coupled to the grip and rotatably coupled to the yoke arm, the inboard beam assembly comprising:
a body;
an upper flange coupled to the body, the upper flange having a first upper inboard aperture and an upper outboard aperture formed therein; and
a lower flange coupled to the body, the lower flange having a first lower inboard aperture and a lower outboard aperture formed therein;
an upper beam fitting coupled to the upper flange, the upper beam fitting comprising:
a first upper inboard post, the first upper inboard post being received by the first upper inboard aperture and secured to the upper flange via a threaded extension from the first upper inboard post; and
an upper outboard post extending parallel to the first upper inboard post, the upper outboard post being received by the upper outboard aperture and secured to the upper flange via a threaded extension from the upper outboard post;
an upper clearance cut formed in the body proximate the upper flange, the upper clearance cut comprising an opening in the body that provides access to the threaded extension from the first upper inboard post and the threaded extension from the upper outboard post;
a lower beam fitting coupled to the lower flange, the lower beam fitting comprising:
a first lower inboard post, the first lower inboard post being received by the first lower inboard aperture and secured to the lower flange via a threaded extension from the first lower inboard post; and
a lower outboard post extending parallel to the first lower inboard post, the lower outboard post being received by the lower outboard aperture and secured to the lower flange via a threaded extension from the lower outboard post.

8. The rotor system of claim 7, wherein the body comprises:
a lower clearance cut formed in the body proximate the lower flange, the lower clearance cut comprising an opening in the body that provides access to the threaded extension from the first lower inboard post and threaded extension from the lower outboard post.

9. The rotor system of claim 8, comprising:
upper detents formed in the body proximate the upper flange; and
lower detents formed in the body proximate the lower flange.

10. The rotor system of claim 9, wherein the body is disposed within the yoke arm.

11. The rotor system of claim 10, wherein body rotates with respect to the yoke arm about an axis of the yoke arm.

12. The rotor system of claim 11, wherein the upper detents and the lower detents permit further rotation of the body with respect to the yoke arm than if the upper detents and the lower detents were not present.

13. The rotor system of claim 8, comprising:
an upper neck region formed in the body proximate the upper flange; and
a lower neck region formed in the body proximate the lower flange.

14. The rotor system of claim 13, wherein the body is disposed within the yoke arm.

15. The rotor system of claim 14, wherein body rotates with respect to the yoke arm about an axis of the yoke arm.

16. The rotor system of claim 15, wherein the upper neck region and the lower neck region permit further rotation of the body with respect to the yoke arm than if the upper neck region and the lower neck region were not present.

17. A method of installing an inboard beam assembly, the method comprising:
arranging an inboard beam in a grip of a rotor blade such that:
a first upper inboard aperture of the inboard beam aligns with a first upper inboard aperture of the grip;
a first lower inboard aperture of the inboard beam aligns with a first lower inboard aperture of the grip;
an upper outboard aperture of the inboard beam aligns with an upper outboard aperture of the grip; and
a lower outboard aperture of the inboard beam aligns with the lower outboard aperture of the grip;
assembling an upper beam fitting such that a first upper inboard post is received through the first upper inboard aperture of the grip and the first upper inboard aperture of the inboard beam and is secured via a threaded extension from the first upper inboard post, wherein the threaded extension from the first upper inboard post is accessible via an upper clearance cut formed in the inboard beam, the upper clearance cut comprising an opening in the inboard beam; and
assembling a lower beam fitting such that a first lower inboard post is received through the first lower inboard aperture of the grip and the first lower inboard aperture of the inboard beam and is secured via a threaded extension from the first lower inboard post.

18. The method of claim 17, wherein the arranging the inboard beam in the grip comprises:
aligning a second upper inboard aperture of the inboard beam with a second upper inboard aperture of the grip; and
aligning a second lower inboard aperture of the inboard beam with a second lower inboard aperture of the grip.

19. The method of claim 18, wherein the assembling the upper beam fitting comprises receiving a second upper inboard post of the upper beam fitting through the second upper inboard aperture of the grip and the second upper inboard aperture of the inboard beam.

20. The method of claim 18, wherein the assembling the lower beam fitting comprises receiving a second lower inboard post of the lower beam fitting through the second lower inboard aperture of the grip and the second lower inboard aperture of the inboard beam.

* * * * *